(No Model.)

A. L. ROBBINS.
LAMP HEATER.

No. 532,215. Patented Jan. 8, 1895.

Witnesses.
O. W. Harbeson.
F. M. Townsend.

Inventor.
Alfred Louis Robbins
By Hazard Townsend
His Attys.

UNITED STATES PATENT OFFICE.

ALFRED LOUIS ROBBINS, OF LOS ANGELES, CALIFORNIA.

LAMP-HEATER.

SPECIFICATION forming part of Letters Patent No. 532,215, dated January 8, 1895.

Application filed July 25, 1894. Serial No. 518,503. (No model.)

*To all whom it may concern:*

Be it known that I, ALFRED LOUIS ROBBINS, a citizen of the United States, residing at Los Angeles, in the county of Los Angeles and State of California, have invented a new and useful Lamp-Heater, of which the following is a specification.

My invention relates to that class of heating devices in which a central-draft lamp is used to produce the heat.

It also is applicable for use with gas burners and other sources of heat.

My appliance is specially adapted for heating and lighting apartments and is also adapted for culinary purposes.

The object of my invention is to provide an appliance of this class which will utilize in the most efficient and economical manner the heat produced from a lamp or other source of heat and light combined, and will give a thorough distribution of heat and light throughout the apartment; also to increase the draft of the lamp by an improvement in the shape of the heat deflector.

The accompanying drawings illustrate my invention.

Figure 1:
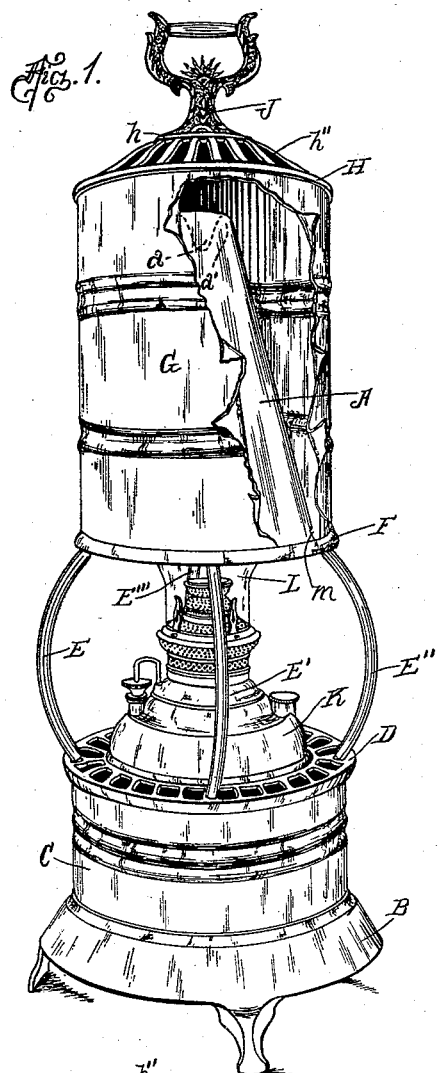
Figure 2:
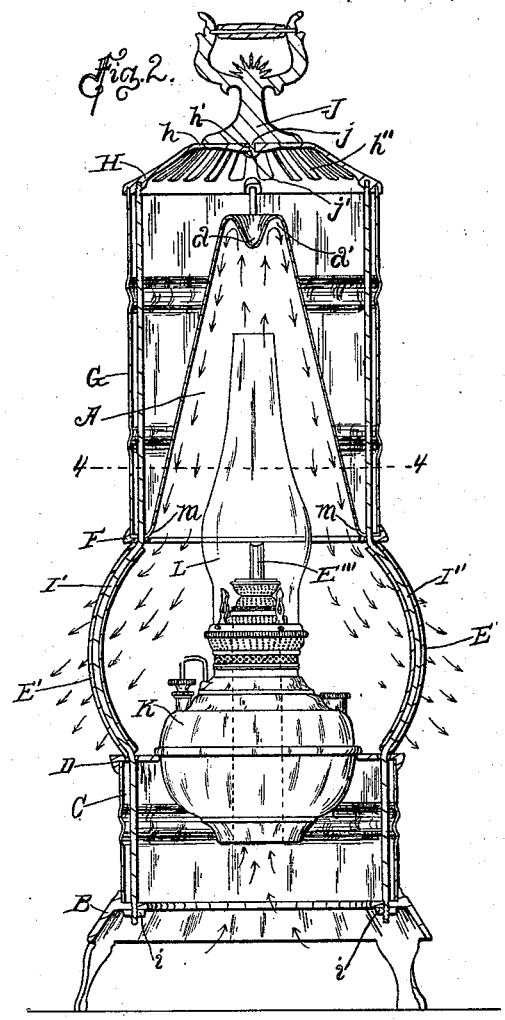
Figure 3:
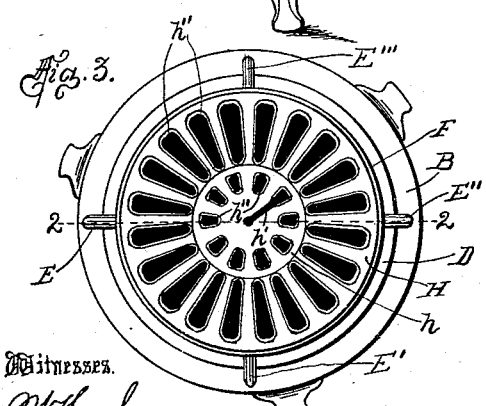
Figure 4:
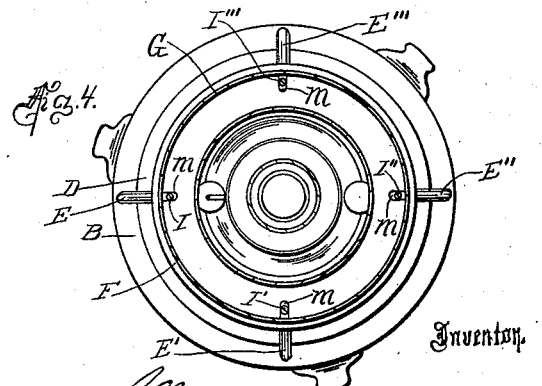

Figure 1 is a perspective view of my improved heater in operation, a portion of the outer casing of the heating drum being broken away to show the heat deflecting cone. Fig. 2 is a vertical mid-section of the heater on line 2—2 Fig. 3. Fig. 3 is a plan with the handle removed from the top. Fig. 4 is a cross section on line 4—4 Fig. 2.

My invention comprises essentially a lamp heater provided with a conical heat deflector and conveyer arranged over the top of the lamp chimney and extending downward around the upper portion of the chimney and flaring outward from the chimney so that the heated air which escapes upward from the top of the chimney will be caught by such deflector and thence directed and conveyed downward below the top of the lamp chimney and thence thrown downward and outward away from the heater. In the heater as I have constructed it, the heat deflector and conveyer practically incloses all the chimney above the flame of the lamp. This conical deflector and conveyer may be made of various shapes and sizes and accomplish the purpose; the essential feature being that it shall extend downward around the lamp chimney and flare outward so that the heat which passes out at the top of the chimney is conducted down below the top of the chimney and thrown downward and outward to convey the heat to the surrounding objects. This heat deflector and conveyer is preferably made of sheet steel and in practical operation it becomes very highly heated and the result of this is to increase the heating of the air and the motion of the particles of air upon each other and increase the draft through the lamp and therefore increase the amount of oxygen consumed and the amount of heat and light produced.

My invention also comprises the peculiar features of construction shown.

The heater as a whole comprises the base B, the cylindrical base casing C mounted upon the base B, the lamp supporting spider D mounted upon the cylindrical base casing C, the tubular dome supports E, E′, E″ and E‴ seated upon the lamp supporting spider D, the dome base ring F mounted upon the dome supports E E′, &c., the conical deflector A seated upon the dome base ring F, the cylindrical dome casing or drum G mounted upon the dome base ring F, the dome top H mounted upon the dome casing or drum G, and the binding rods I, I′, I″ and I‴ provided with suitable nuts or other fastenings and connecting the dome top and the base B together, and thus binding the intermediate parts together. In practice, the binding rods I, &c., pass through the tubular supports E and such supports E are made of brass tubing and give an ornamental appearance to the heater.

*i* indicates the fastenings for the rods.

The top of the dome is provided at its center with a flattened space *h* adapted to seat an ornamental handle J which is secured to the top by means of a lug *j* which projects downward from the under side of the handle, and is provided at its end with a head *j′*. The dome top is provided with a slot *h′* extending from the center of the top outward and being large enough at its outer end to allow the head of the lug *j* to be passed therethrough and being smaller at the center of the dome top so that when the lug has been passed through the slot and shoved to the center of the dome it cannot be withdrawn upward.

The dome top is thickened at the center so that the head of the lug will bind thereagainst and hold the handle tight and prevent its removal.

In practice the handle is ordinarily left in the position shown in Fig. 1, so that the heater can be conveniently carried from place to place, but when it is desired to use the heater for culinary purposes or for heating water, the handle is removed by slipping the lug along the slot until it can be withdrawn therefrom, and this leaves the flat space $h$ free to receive and hold the vessel in which the cooking can be done or the water heated. A considerable amount of heat is thrown off from the heated steel cone and is sufficient for cooking and for heating water in a small way.

I believe the best results in distributing the heated air can be produced by providing the apex of the cone with a downwardly projecting conical point $a$ and shaping the cone to form an annular parabolic recess $a'$ above the lamp chimney so that the air which rises from the lamp chimney will first be deflected upwardly, and will be gradually turned from its course and directed down into the main body of the cone.

K indicates the lamp and L indicates the lamp chimney.

It is believed that a degree of advantage is secured by providing small air passages $m$ at the base of the cone A to admit air into the drum G and the top of the drum is provided with perforations $h''$ to allow the heat from the cone to pass upward freely through the top so that if the passages $m$ are provided as shown, a slight draft will be produced through the drum. I do not desire, however, to produce much of a draft through the space outside the cone and wish my claims to cover the heater without the air inlets $m$ and outlets $h''$ at the bottom and top of the drum, as well as with them.

Now, having described my invention, what I claim as new, and desire to secure by Letters Patent, is—

1. The lamp heater set forth comprising the base, the cylindrical base casing mounted upon the base, the lamp supporting spider mounted upon the cylindrical base casing, the dome supports seated upon the lamp supporting spider, the dome base ring mounted upon the dome supports, the conical heat deflector and conveyer seated upon the dome base ring, the cylindrical dome casing mounted upon the dome base ring, the dome top mounted upon the dome casing and the binding rods provided with suitable fastenings and connecting the dome top and the base together, and binding the intermediate parts together.

2. The lamp heater provided with a conical heat deflector and conveyer arranged over the top of the lamp chimney and extending downward around the upper portion of the lamp chimney and flaring outward from the chimney and provided at its apex with a downwardly projecting conical point arranged in combination with the main body of the conical deflector to form therewith an annular parabolic recess.

ALFRED LOUIS ROBBINS.

Witnesses:
JAMES R. TOWNSEND,
ALFRED I. TOWNSEND.